United States Patent [19]
Genet et al.

[11] Patent Number: 5,953,678
[45] Date of Patent: Sep. 14, 1999

[54] THORIUM PHOSPHATES, METHOD FOR PREPARING SAME, AND USE THEREOF FOR STORING RADIOACTIVE MATERIALS

[75] Inventors: Michel Genet, Palaiseau; Vladimir Brandel, L'Hay-les-Roses; Nicolas Dacheux, Bouray S/Juine; Catherine Lindecker, Bures/Yvette, all of France

[73] Assignee: Centre National de la Recherche, Paris, France

[21] Appl. No.: 08/913,584
[22] PCT Filed: Mar. 28, 1996
[86] PCT No.: PCT/FR96/00472
  § 371 Date: Sep. 18, 1997
  § 102(e) Date: Sep. 18, 1997
[87] PCT Pub. No.: WO96/30300
  PCT Pub. Date: Oct. 3, 1996

[30] Foreign Application Priority Data

Mar. 29, 1995 [FR] France .................................. 95 03689

[51] Int. Cl.$^6$ .............................. C01F 15/00; G21F 9/00
[52] U.S. Cl. ............................................. 588/2; 423/252
[58] Field of Search .......................... 423/252; 252/625; 588/2

[56] References Cited

U.S. PATENT DOCUMENTS 3,351,436  11/1967  Sarver .
5,403,565   4/1995  Delloye et al. .............................. 423/2

FOREIGN PATENT DOCUMENTS 0 594 485   4/1994  European Pat. Off. .

OTHER PUBLICATIONS

Chemistry of Materials, vol. 8, No. 1, Jan. 1996, pp. 181–188, Benard P. et al., "Th4(PO4)P2O7, a new thorium phosphate: synthesis, characterization and structure determination".

New Journal of Chemistry, vol. 20, No. 3, Mar., 1996, pp. 301–310, XP000575193, Dacheux N. et al.: "Solid solutions of uranium and thorium phosphates: synthesis, characterization and x–ray photoelectron spectroscopy."

New Journal of Chemistry, vol. 19, No. 3, pp. 275–285, XP002007017, Merigou C. et al., "Synthesis and Physico–chemical characterization of thorium monophosphate". (date unknown).

Chem. Abstracts, vol. 85, No. 14, Oct. 4, 1976, Columbus, Ohio; Abstract No. 103175, Tananaev I. et al. "Study of thorium phosphates".

Journal of the Less–Common Metals, vol. 102, Lausanne, CH, pp. 179–186, XP002007018, Bamberger, C.E. et al.: The synthesis and characterization of crystalline phosphates of thorium, uranium and neptunium. (date unknown).

Materials Research Society Symposium Proceedings. Scientific Basis for Nuclear Waste, Management XVIII. Symposium Held Oct. 23–27, 1994, Kyoto, Japan, vol. 33, Pittsburgh, PA, pp. 799–806, XP002007019, Genet et al.: "Thorium and Uranium phosphate syntheses and lixiviation tests for their use as hosts for radwastes".

Primary Examiner—Wayne Langel
Attorney, Agent, or Firm—Pearne, Gordon, McCoy & Granger LLP

[57] ABSTRACT

The invention relates to novel thorium phosphates, their preparation process and their use for the storage of radioactive products.

These novel thorium phosphates comply with the formulas $Th_4P_6O_{23}$ (I) or $Th_{4-x}M_{4x/v}P_6O_{23}$ (III) in which:

M is a monovalent, divalent, trivalent or tetravalent cation, v represents the valency state of the cation and is equal to 1, 2, 3 or 4, and x is such that:
    $0 < x \leq 3$ when v=4
    $0 < x \leq 0.26$ when v=3
    $0 < x \leq 0.1$ when v=2, and
    $0 < x \leq 0.036$ when v=1.

The cation M can in particular be a radioactive element.

20 Claims, 3 Drawing Sheets

THORIUM PHOSPHATES, METHOD FOR PREPARING SAME, AND USE THEREOF FOR STORING RADIOACTIVE MATERIALS

DESCRIPTION

The present invention relates to novel thorium phosphates more particularly usable for the long-term storage of radioactive products such as radioactive and nuclear waste.

The problem of nuclear waste is linked with the reprocessing of spent nuclear fuels supplied by nuclear power stations after use. Thus, the processing of such fuels leads to the separation of the radioelements into different categories, on the one hand uranium and plutonium, and on the other hand fission products (mainly $^{90}$Sr and $^{137}$Cs) and minor actinides (Np, Am and Cm). At present fission products and minor actinides are stored together being incorporated into a specially developed glass.

Within the framework of the new policy of managing nuclear waste, consideration is being given to the separation of the fission products from the minor actinides in order to store them separately and the possibility has been studied of using matrixes other than glass for storing said actinides.

Thus, other matrixes are being investigated, which are able to contain actinides in large quantities, whilst still having solubility properties lower than those of glass matrixes.

EP-A-594 485 describes a thorium phosphate preparation process making it possible to render insoluble thorium 232, as well as its daughter products and in particular radium 228, and to purify effluents containing such compounds. Thorium phosphate has an extremely low leachability and is therefore suitable for the durable, long-term storage of thorium 232 and radium 228. The thorium phosphate obtained in this process complies with the formula: $Th_3(PO_4)_4$.

The present invention relates to a novel thorium phosphate not only suitable for the long-term storage of radioactive products such as thorium and its daughter products, but also for the long-term storage of minor actinides and other fission products.

According to the invention, this novel thorium phosphate complies with the formula: $Th_4P_6O_{23}$ (I), which can also be written: $Th_4(PO_4)_4(P_2O_7)$ (II).

This novel thorium phosphate can be prepared from a thorium compound and a phosphating agent either by a wet process, or by a dry process, provided that use is made of quantities of the thorium compound and the phosphating agent corresponding to a molar ratio Th/P from ¼ to ⅔.

When said synthesis is carried out by the wet process, the following stages can be performed:

a) preparation of an aqueous solution optionally containing another solvent miscible with water, e.g. alcohol or acetone and containing a thorium salt and a phosphating agent in quantities such that the atomic ratio Th/P is ¼ to ⅔, b) dry evaporation of the solution at a temperature below 200° C. and c) subjecting the dry product to a heat treatment at least partly performed at a temperature from 850 to 1300° C.

The aqueous starting solution can be acid, neutral or basic and can be a dilute or concentrated medium. The pH of this medium is more particularly dependent on the phosphating agent used and can be adjusted by the addition of appropriate acids or bases.

As examples of bases reference can be made to ammonia and its organic or mineral derivatives e.g. $(C_2H_5)_4NOH$ and $NH_2$—$NH_2$. The acid can be hydrochloric, nitric or acetic acid.

The thorium salts used for the preparation of this solution are preferably water-soluble thorium salts, e.g. the chloride $ThCl_4$, the nitrate $Th(NO_3)_4$, $4H_2O$, thorium acetate $Th(CH_3COO)_4$, thorium oxalate $Th(C_2O_4)_2$ or any other thorium salt soluble in an acid medium.

The phosphating agent used can be of different types. Examples of such agents are phosphoric acid $H_3PO_4$ or ammonium dihydrogenorthophosphate $NH_4H_2PO_4$.

When synthesis takes place in an acid medium, generally there is a slow evaporation of the solution (e.g. at 150° C.) to obtain a dry product. This dry product firstly undergoes a treatment at a moderate temperature (400 to 500° C.) in order to eliminate volatile matter, followed by calcining (850 to 1300° C.) in order to obtain the crystalline thorium phosphate.

When working in a basic medium, generally a solidification of the reagents is rapidly obtained and drying also takes place at a temperature close to 150° C., followed by a first treatment at a moderate temperature and a final calcination treatment, as hereinbefore.

Between these different treatments, one or more product grinding operations can be performed.

When synthesis is carried out by the dry process, reaction takes place in the solid state of a thorium compound and a phosphating agent chosen from among ammonium dihydrogenorthophosphate and $BPO_4$, at a temperature of 165 to 210° C., followed by at least one grinding operation and at least one heat treatment of the product obtained at a temperature of 850 to 1300° C.

As previously, the quantities of the thorium compound and the phosphating agent used are such that the atomic ratio Th/P is ¼ to ⅔.

When $BPO_4$ is used as the phosphating agent, the heat treatment takes place at between 850 and 1300° C., followed by washing operations with hot water in order to eliminate the in situ formed boron oxide $B_2O_3$.

The thorium compound used for this dry process synthesis can e.g. be an oxide $ThO_2$ or a thorium salt such as $Th(NO_3)_4$, $4H_2O$, $ThCl_4$, $Th(C_2O_4)_2$.

When using a TH/P ratio below ⅔, e.g. ⅗, the following reactions are obtained:

As is indicated by the reaction, the system is two-phase, but when heating at a high temperature during the heat treatment, e.g. to a temperature equal to or above 1200° C., but below 1300° C., the thorium diphosphate decomposes with a giving off of the excess phosphate in the form $P_4O_{10}$ and the formation of $Th_4P_6O_{23}$ in accordance with the reaction:

When the ratio is above ⅔ (thorium excess), the latter is in the form $ThO_2$ and no pure phosphate $Th_4P_6O_{23}$ is formed, the system remaining two-phase and corresponds to a mixture of $Th_4P_6O_{23}$ and $ThO_2$.

All these different possibilities are illustrated by the following diagram:

Thus, the decomposition by heat treatment leads to a pure compound with the single formula: $Th_4P_6O_{23}$.

With $r=\frac{1}{2}$, we obtain:

$$ThCl_4 + 2H_3PO_4 \rightarrow ThP_2O_7 + 4HCl\uparrow + H_2O\uparrow$$

With $r=\frac{1}{4}$, we obtain:

$$ThCl_4 + 4H_3PO_4 \rightarrow Th(PO_3)_4 + 4HCl\uparrow + 4H_2O\uparrow \; 2Th(PO_3)_4 \rightarrow 2ThP_2O_7 + P_4O_{10}\uparrow$$

These reactions are followed by:

$$8ThP_2O_7 \rightarrow 2Th_4P_6O_{23} + P_4O_{10}\mathbf{52}$$

Thus, any phosphate excess is always decomposed by heating, whereas any thorium excess is manifested by the formation of $ThO_2$, which remains no matter what the heat treatment temperature.

The invention also relates to mixed phosphates of thorium and another element, which are in particular suitable for the long-term storage of natural or artificial radioactive elements.

These mixed phosphates of thorium comply with the formula:

$$Th_{4-x}M_{4x/v}P_6O_{23} \qquad (III)$$

in which:

M is a monovalent, divalent, trivalent or tetravalent cation, v represents the valency state of the cation and is equal to 1, 2, 3 or 4 and x is such that:
 $0 < x \leq 3$ when $v=4$,
 $0 < x \leq 0.26$ when $v=3$,
 $0 < x \leq 0.1$ when $v=2$, and
 $0 < x \leq 0.036$ when $v=1$.

The monovalent or divalent cations which can be included in this mixed phosphate can in particular be alkali metals such as Cs or alkaline earth metals such as Sr, Ba and Ca. The trivalent cations can in particular be elements of rare earths or trivalent actinides such as Am and Cm. The tetravalent cations can be uranium and actinides such as Np and Pu.

It is pointed out that in the above formula (III), the cation M may contain solely a metal or can be formed by the combination of a metal and other elements such as oxygen, as is e.g. the case with the cations $UO_2^{2+}$, $NpO_2^{2+}$ and $PuO_2^{2+}$.

The mixed phosphates of formula (III) can be prepared by the wet or dry process using procedures identical to those used for preparing the pure thorium phosphate of formula (I), adding to the aqueous starting solution or to the products reacting in the solid state a compound of the cation to be included. The added cation quantities must not exceed the prescribed limits so that the crystalline structure of the mixed phosphate of formula (III) obtained is the same as that of the pure thorium phosphate of formula (I) and the system remains single-phase. Thus, they must not represent an excess compared with the maximum value of x given for formula (III). Moreover, the quantities of salts, compounds and phosphating agent must be such that the ratio $(Th+M)/P$ is approximately $$\frac{4-x+\frac{4x}{v}}{6}.$$

In all the synthesis processes of the thorium phosphates of the aforementioned formulas (I), (II) and (III), the heat treatments can be performed in platinum or refractory material crucibles such as alumina, porcelain, silica, in the presence of air or under an inert gas atmosphere such as argon or nitrogen.

Heating can take place rapidly, e.g. at 25° C./min, or slowly, e.g. at 1° C./min. In the same way, the final cooling can be fast or slow.

However, in the case of phosphates containing easily oxidizable elements such as uranium, it is preferable to carry out the heat treatment under an inert atmosphere.

The temperatures used for the final heat treatment are dependent on the synthesis process, the reagent quantities used and the elements added in the case of mixed thorium phosphates.

In wet process syntheses maximum temperatures of 1150° C. for periods of 6 to 24 hours are generally adequate for obtaining thorium phosphate (weighing 5 to 25 grams).

In dry processes syntheses it is possible to operate at temperatures close to 900° C. for 6 to 24 hours for pure phosphate and temperatures higher than this, e.g. 1300° C., for 6 to 24 hours in the case of mixed phosphates.

In dry process syntheses, the starting products are intimately ground in order to accelerate the solid state reaction.

It is also possible to prepare the mixed thorium phosphate of formula (III) by a process in which reaction takes place in the solid state, in the form of a powder and at a temperature of 850 to 1350° C., of the thorium phosphate of formula $Th_4P_6O_{23}$ with a phosphate of the cation M in a quantity such that the cation M does not represent an excess compared with the maximum value of x in formula (III), followed by a heat treatment on the product obtained at a temperature between 850 and 1300° C.

The invention also relates to a process for the storage of radioactive products containing radioelements, which consists of including these radioelements in a mixed thorium phosphate of formula:

$$Th_{4-x}M_{4x/v}P_6O_{23} \qquad (III)$$

in which:

M represents a monovalent, divalent, trivalent or tetravalent cation containing the radioelement, v represents the valency state of the cation and is equal to 1, 2, 3 or 4 and x is such that:
$0 < x \leq 3$ when v=4,
$0 < x \leq 0.26$ when v=3,
$0 < x \leq 0.1$ when v=2, and
$0 < x \leq 0.036$ when v=1.

It is pointed out that the term "radioelement" relates both to natural radioactive elements and artificial radioactive elements.

According to a performance variant, it is also possible to carry out the storage of the radioactive products by dispersing them in a matrix of thorium phosphate of formula (I) or mixed thorium phosphate of formula (III), described hereinbefore.

The radioactive products can be constituted by radium, major actinides: uranium and plutonium, minor actinides: neptunium, americium and curium, and/or fission products.

The use of the thorium phosphates according to the invention for the storage of radioactive products offers numerous advantages, particularly for the retention of minor actinides. Thus, these thorium phosphates have a very low solubility, so that they are resistant to leaching.

Thorium is an inexpensive element, because it has hitherto been industrially unsuccessful. However, it is produced continuously in rare earth production plants, because the ores of lanthanides virtually all contain thorium. Therefore it is a disturbing byproduct and its storage as a weakly radioactive waste is itself a problem. In addition, its use for storing other radioactive products is of interest.

Phosphoric acid and phosphates in general are well known products of the chemical industry and are not very onerous.

Thus, the thorium phosphate according to the invention is very interesting for the long-term storage of radioactive elements, particularly minor actinides, because it can accept 5 to 10% of the latter.

It is also suitable for the confinement and retention of the radium present in mining residues resulting in particular from uranium mines. Thus, these mines produce large amounts of liquid and solid residues, which contain radium in a concentration higher than the limits imposed by the law.

It is also possible to use it for the storage and retention of fission products such as $^{90}$Sr and trivalent lanthanides.

Other features and advantages of the invention can be gathered from the following non-limitative description with reference to the attached drawings, wherein show.

EXAMPLE 1

Preparation of $Th_4P_6O_{23}$ in an Acid Medium

In this example synthesis takes place of $Th_4P_6O_{23}$ from $ThCl_4$ and phosphoric acid working in a concentrated acid medium.

The overall synthesis reaction corresponds to the following diagram:

$$4ThCl_4 + 6H_3PO_4 \rightarrow Th_4P_6O_{23} + 16HCl\uparrow + H_2O\uparrow$$

Mixing takes place of 67.5 cm$^3$ of an aqueous alcoholic solution (H$_2$O/ethanol, 50/50 by volume) of 1 mole/l ThCl$_4$ and 6.75 cm$^3$ of a concentrated, 15 mole/l phosphoric acid H$_3$PO$_4$ solution, giving a very acid, clear solution with a pH below 0.

After evaporating the solution to dryness on a sand bath, at 140° C. for 4 to 5 hours, grinding takes place of the residue obtained, after which the ground residue is raised to 400° C. for 2 hours with a heating rate of 5° C./min, followed by calcining at 1150° C. for 10 hours in an alumina crucible.

This gives 25 g of thorium phosphate Th$_4$P$_6$O$_{23}$ and the characteristics of this product are checked by X-ray diffraction, infrared absorption spectroscopy, electron microprobe analysis and photoelectron spectroscopy.

The X-ray diffraction pattern is obtained by means of the Philips PW 1050 apparatus using the K$_\alpha$ line of copper ($\lambda$=1.5418 Å, Ni filter). This pattern is shown in FIG. 1 and has lines at 2θ=17°, 2θ=20.5° and 2θ=30.5°.

Figure 2:
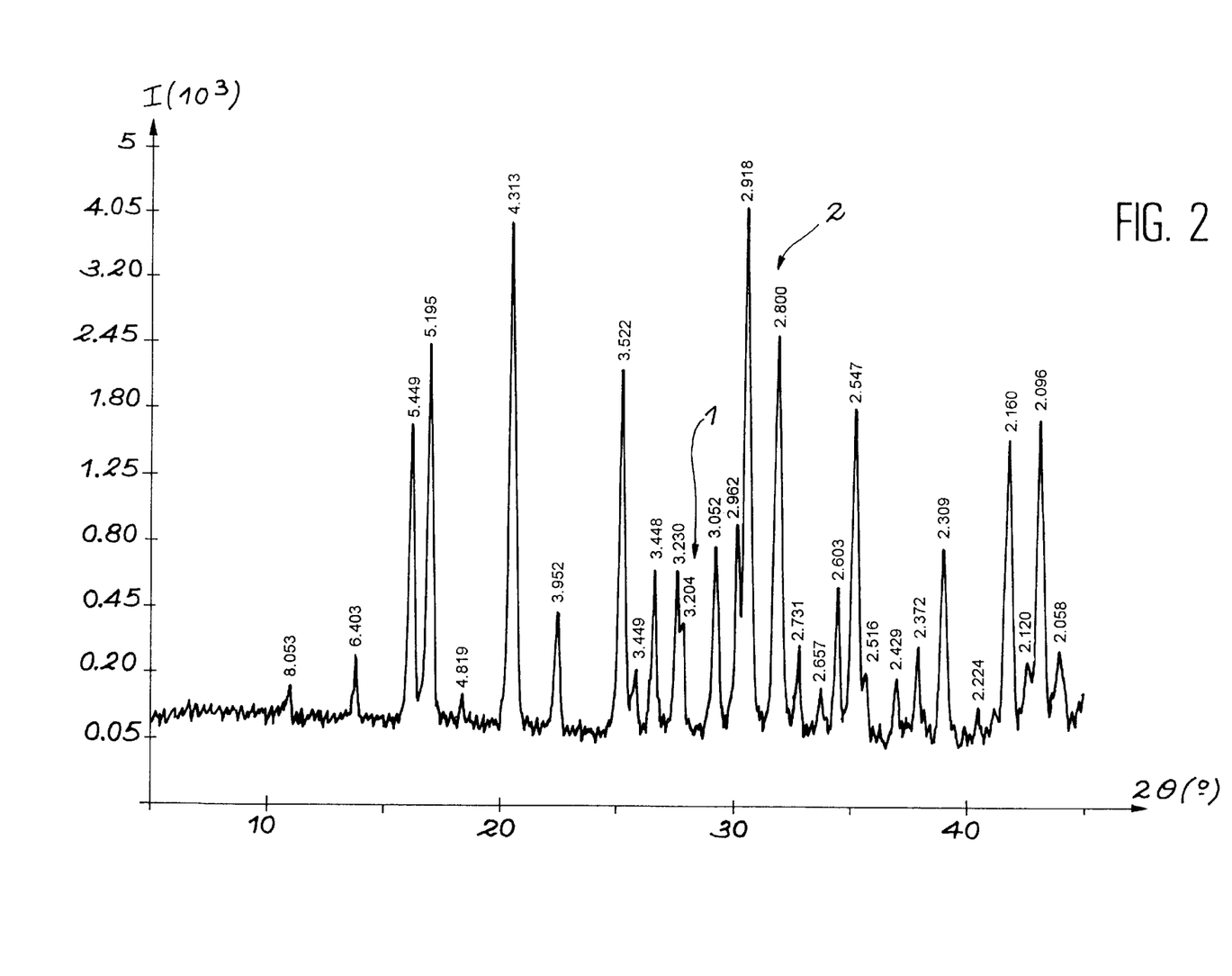
FIG. 2 For comparison, the X-ray diffraction pattern of the thorium phosphate according to EP-A-594 485.

For comparison purposes, FIG. 2 gives the X-ray diffraction spectrum of the product obtained in EP-A-594 485.

Figure 1:
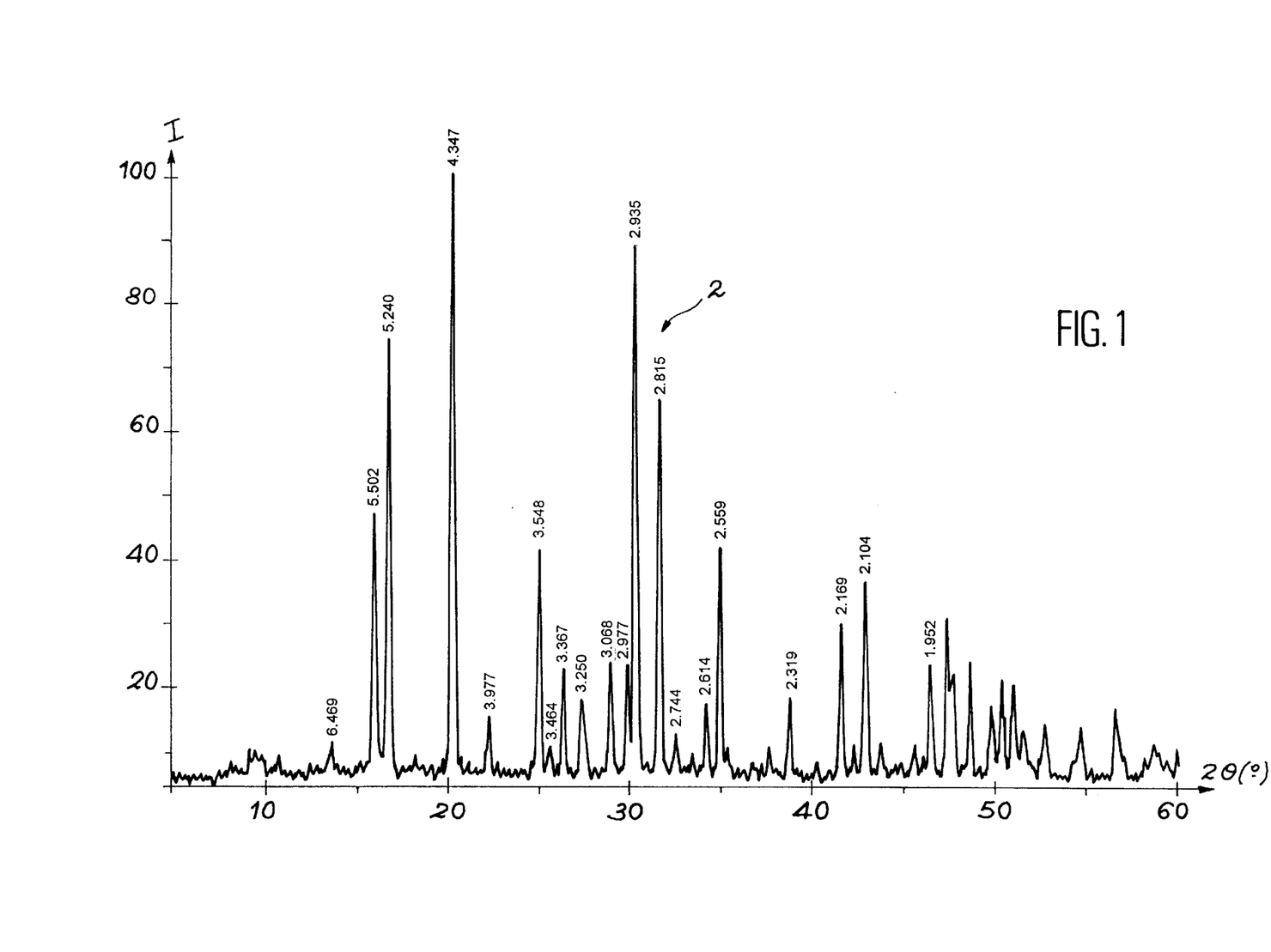
FIG. 1 The X-ray diffraction pattern of pure thorium phosphate according to the invention.

A comparison of these two spectra reveals that the spectrum of FIG. 2 has a line (1) at d=3.204 Å, which is that of thoria ThO$_2$, said line being absent in the spectrum of FIG. 1. Moreover, the spectrum of FIG. 2 has a hypertrophy of the line (2) at d=2.800 Å compared with the same line (2) in FIG. 1 corresponding to the thorium phosphate according to the invention.

It is therefore clear that the thorium phosphate according to the invention is different from the thorium phosphate described in EP-A-594 485.

On the basis of the crystallographic indexings performed on the powder and on the monocrystal, the thorium phosphate according to the invention crystallizes in an orthorhombic system (space group Pbcm and Z=2).

The measured value of the density is equal to 5.23 g/cm$^3$ which is in good agreement with the calculated value (5.17 g/cm ). The mesh parameters are as follows:

a=1.04082 (9) nm
b=1.2836 (1) nm
c=0.70600 (8) nm
V=0.943 nm$^3$

Figure 3:
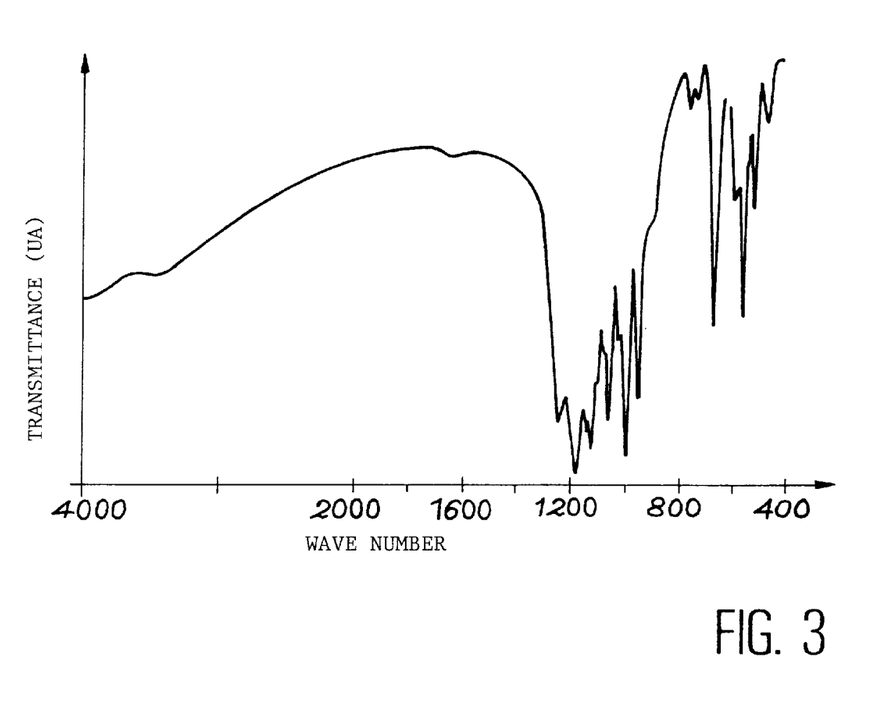
FIG. 3 The infrared absorption spectrum of the pure thorium phosphate according to the invention.

FIG. 3 shows the infrared absorption spectrum of the thorium phosphate according to the invention. This spectrum confirms the simultaneous presence of orthophosphate groups PO$_4$ (revealed by the presence of bands attributed to stretching vibrations between 950 and 1250 cm$^{-1}$ and ending vibrations below 600 cm$^{-1}$) and diphosphate groups P$_2$O$_7$, whose characteristic vibrations associated with the P—O—P bond are at 950 cm$^{-1}$ and 750 cm$^{-1}$ (doublet for Th$_4$P$_6$O$_{23}$). Thus, this spectrum confirms the proposed formula: Th$_4$(PO$_4$)$_4$P$_2$O$_7$.

In view of the very low solubility of the thorium phosphate obtained according to the invention, it is not possible to use the conventional aqueous process analytical chemistry methods. Thus, use was made of a physicochemical method permitting elementary analysis to take place directly on the solid.

By electron microprobe analysis confirmed for the thorium phosphate the existence of a single phase, whose Th/P ratio is identical to that of the chemical formula. This electron microprobe analysis indicates that the product is anhydrous, the analyses connect at 96% on average, there is no phase mixing and the Th/P ratio is 0.67±0.02. This corresponds to a chemical formula Th/P=⅔ i.e. 0.66.

Photoelectron spectroscopy also confirms the chemical formula $Th_4(PO_4)_4P_2O_7$.

EXAMPLE 2

The same operating procedure as in example 1 is used for preparing pure $Th_4P_6O_{23}$ by the wet process, but using as the thorium salt thorium nitrate $Th(NO_3)_4, 4H_2O$.

This synthesis is carried out in a dilute acid medium and corresponds to the following reaction diagram:

$$4Th(NO_3)_4, 4H_2O + 6H_3PO_4 \rightarrow Th_4P_6O_{23} + 16HNO_3\uparrow + 17H_2O\uparrow$$

In this case use is made of 76.7 cm³ of a 0.88 mole/l thorium nitrate solution by dissolving 48.61 g of nitrate crystallized in 100 cm³, and 99.3 cm³ of a 1.02 mole/l phosphoric acid solution obtained by diluting the concentrated solution. This is followed by drying and calcining as in example 1.

The product obtained has the same characteristics as the thorium phosphate of example 1.

EXAMPLE 3
Preparation of $Th_4P_6O_{23}$ in a Basic Medium

In this example preparation takes place of the thorium phosphate from $ThCl_4$ and $NH_4H_2PO_4$ in a basic solution, the reaction corresponding to the following ing diagram:

$$4ThCl_4 + 6NH_4H_2PO_4 + 10NH_{3aq} \rightarrow Th_4P_6O_{23} + 16NH_4Cl\uparrow + H_2O\uparrow$$

Mixing takes place of 67.5 cm³ of an aqueous 1 mole/l $ThCl_4$ solution and 101.3 cm³ of an aqueous 1 mole/l $NH_4H_2PO_4$ solution, made basic with the aid of an ammonia solution and the pH is adjusted to 10 by adding aqueous $NH_3$.

Under these conditions, there is a complete solidification of the reagents at ambient temperature. The most volatile matter is eliminated by drying in the sand bath at 140° C. for 4 to 5 hours, followed by the grinding of the residue. The ground residue undergoes a heat treatment at 500° C. programming a heating gradient of 5° C. per minute in order to evaporate $NH_4Cl$, followed by calcining at 1150° C. for 10 hours in an alumina crucible.

This gives 25 g of thorium phosphate having the same characteristics as the product obtained in example 1.

EXAMPLE 4
Preparation of Thorium Phosphate by the Dry Process

In this example, reaction takes place in the solid state of thorium nitrate and ammonium dihydrogenorthophosphate.

To this end, into an alumina boat, lined or not lined with a platinum sheet, are introduced 37.25 g of $Th(NO_3)_4, 4H_2O$ and 11.65 g of $NH_4H_2PO_4$. In order to avoid losses by splashing during the transformation of the phosphating agent, a first heating takes place at 165° C. for 12 to 24 hours. This is followed by successive heating levels of 1 hour over the temperature range 170 to 190° C. with gradual 5° C. steps. There is a final heat treatment at 250° C. for 6 hours, followed by the grinding of the reaction mixture.

Two successive annealing operations are carried out, respectively at 500° C. for 4 hours and 900° C. for at least 6 hours, in order to obtain a loss of all the volatile products, which corresponds to a weight loss of approximately 14%. As the synthesized thorium phosphate weight exceeds 5 g, it is necessary to carry out several annealing operations at 900° C. in order to obtain a pure phase or to increase the temperature of the final heat treatment. In this case, each annealing is followed by a grinding in order to ensure a perfect homogenization of the reaction medium.

The thorium phosphate obtained has the same characteristics as the product of example 1.

EXAMPLE 5
Preparation of a Mixed Thorium Phosphate of Formula $Th_2U_2(PO_4)_4P_2O_7$ This wet process synthesis takes place using as the thorium salt $ThCl_4$ and as the uranium salt $UCl_4$ and phosphoric acid. In this case, the initial uranium (IV)/thorium ratio is 1:1 and the initial uranium (IV)+thorium/phosphate ratio is 2:3.

Mixing takes place of 20.9 cm³ of an aqueous 1.6 mole/l solution of $UCl_4$, 33.5 cm³ of an aqueous 1 mole/l solution of $ThCl_4$ and 6.7 cm³ of a concentrated 15 mole/l phosphoric acid $H_3PO_4$ solution. The solution is then evaporated to dryness as in example 1. The residue is ground and treated at 400° C. with a temperature rise rate of 5° C./min for 2 hours and under an inert atmosphere (argon). The product is then calcined at 1150° C. for 15 hours, under an inert atmosphere.

The same results are obtained using aqueous alcoholic solutions ($H_2O$/ethanol) in place of aqueous solutions of $ThCl_4$ and $UCl_4$.

EXAMPLE 6
Preparation of $Th_3U(PO_4)_4P_2O_7$

In this example, dry process synthesis takes place using thorium phosphate $Th_4P_6O_{23}$ prepared in example 1 and uranium (IV) diphosphate $\alpha$-$UP_2O_7$.

To this end, mixing takes place of 6.92 g of $\alpha$-$UP_2O_7$ and 18.67 g of $Th_4P_6O_{23}$ prepared in example 1 and grinding takes place thereof. This is followed by the heating of the mixture for 30 minutes at 850° C. and under an inert atmosphere (argon), using a gradient of 5° C./min. It is then raised for 20 hours to 1300° C. under an inert atmosphere. Finally 25 g of $Th_3U(PO_4)_4P_2O_7$ are obtained.

EXAMPLE 7
Preparation of Mixed Thorium Phosphate of Formula $Th_3U(PO_4)_4P_2O_7$ In this example, dry process synthesis is again used, but starting with uranium oxide, thorium oxide and ammonium dihydrogenorthophosphate.

To this end, heating takes place at 210° C. and for 20 hours of a previously ground mixture of 4.54 g of uranium oxide $UO_2$, 13.31 g of thorium oxide $ThO_2$, and 11.59 g of $NH_4H_2PO_4$. The mixture is then raised to 1300° C. for 20 hours under argon. This gives a mixed phosphate of thorium and uranium according to the invention.

EXAMPLE 8
Preparation of $^{230}U$-labelled $Th_2U_2(PO_4)_4P_2O_7$

In this example, the operating procedure of example 5 is followed, but starting with a mixture of aqueous solutions of 0.485 cm³ $^{238}UCl_4$ (1.6M) and 0.250 cm³ $^{230}UCl_4$ ($1.1.10^{-7}$M) and use is made of 0.240 cm³ 4.85 mole/l orthophosphoric acid. The total $^{230}U$ activity is 6.60 MBq. The residue of the evaporation to dryness is ground at then treated at 400° C. under argon for 2 hours and then at 1050° C. for 15 hours. This gives 0.2 g of $^{230}U$-isotope-labelled mixed phosphate following all the synthesis stages.

EXAMPLE 9

This example tests the resistance to leaching of the product obtained in example 8.

For this purpose contacting takes place of 200 mg of the product and 4 cm³ of distilled water and the complete solution is replenished in contact with the powder several times so as to wash its surface and thus eliminate small grains.

The powder sample is then stirred for 3 or 4 days in 4 cm$^3$ of water, followed by centrifuging at 3500 r.p.m. for 30 minutes, in order to carry out a first separation of the solid and liquid phases. Most of the contact solution (3.5 cm$^3$) is then sampled before being replenished. After the separation of the solid phase and the liquid phase, determination takes place of the uranium quantity which has passed into solution by measuring the radioactivity due to $^{230}$U in the liquid phase by γ spectrometry.

On the basis of the activity percentage measured in the solution compared with the initial activity introduced for the preparation of the product, calculation takes place of the equivalent concentration of total uranium passed into solution assuming a priori that $^{230}$U and $^{238}$U behave in the same way.

The results obtained are given in the following table 2.

TABLE 2

| initial activity introduced (MBq) | specific activity (MBq/g of phosphate) | Percentage activity measured in solution | Equivalent C238U concentration (M) |
|---|---|---|---|
| 6.60 | 23.6 | (6.9 ± 1.0) 10$^{-3}$ | (5.5 ± 0.8) 10$^{-6}$ |

Figure 4:
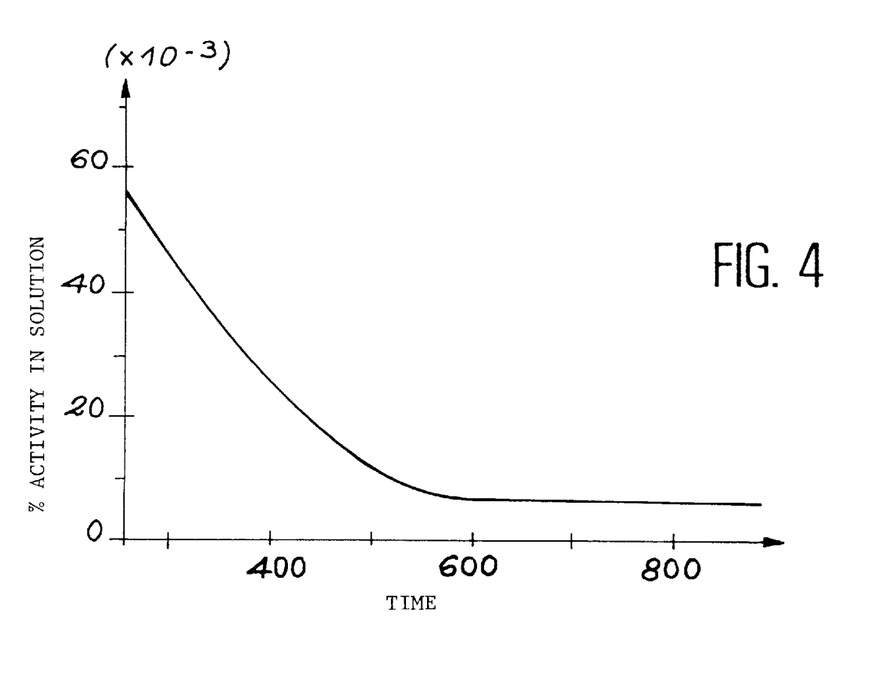
FIG. 4 A curve illustrating the leaching test results with respect to $^{230}$U on the basis of a mixed phosphate containing it, the curve representing the activity percentage released in the leached product as a function of time (in hours).

FIG. 4 shows the activity percentage measured in solution as a function of time (in hours).

On the basis of FIG. 4, it can be seen that the first samplings lead to high activity percentage values in the leached product, but after 500 hours of contact this activity percentage is stable and established at approximately 7.10$^{-3}$%.

This value is comparable with that obtained in the case of pure thorium phosphate Th$_4$P$_6$O$_{23}$ labelled with $^{223}$Ra where, after stabilization, the activity percentage in solution represents 5.3.10$^{-3}$% of the initial activity.

It should also be noted that the corresponding $^{238}$U concentration is close to 5.5.10$^{-6}$ mole/l and is well below that measured for pure uranium phosphate phate U(UO$_2$)(PO$_4$)$_2$ for which it is, under the same conditions, 2.5.10$^{-4}$ mole/l.

If the same leaching tests are performed on Th$_2$U$_2$(PO$_4$)$_4$P$_2$O$_7$, but using an aqueous 1 mole/l HClO$_4$ solution instead of distilled water, the equivalent uranium 238 concentration passes to 8.1.10$^{-4}$ mole/l. This mixed phosphate of thorium and uranium consequently has a resistance to corrosion in an acid medium higher than that of identical products.

EXAMPLE 10

Preparation of Th$_4$P$_6$O$_{23}$ containing 8 molar % UO$_2^{2+}$

For this synthesis the operating procedure of example 5 is used, but employing an initial U(IV)/Th ratio of 0.08 and the final heat treatment is performed at 1150° C., for 15 hours and in air, which leads to the formation of UO$_2^{2+}$ in the phosphate obtained.

Leaching tests performed under the same conditions as those of example 9 lead, after 15 days contact, to an average uranium concentration of 2.0.10$^{-6}$ mole/l, which corresponds to 1.7.10$^{-2}$% of the uranium present in the solid. Thus, results equivalent to those of example 9 are obtained.

EXAMPLE 11

Preparation of Th$_4$P$_6$O$_{23}$ Containing 1 Molar % Eu$^{3+}$

The operating procedure of example 5 is used for preparing this mixed phosphate, but using the initial ratio Eu(III)/Th of 0.01.

The product obtained undergoes leaching tests under the same conditions as in example 9.

After 2 months contact, the europium concentration of the aqueous phase determined by fluorescence is 1.9±0.6.10$^{-7}$ mole/l, i.e. a europium percentage close to 1.4±0.4.10$^{-2}$% of the europium introduced into the mixed phosphate.

The results of examples 9 to 11 show that the concentrations of the different species measured in the leached product are linked with the dissolving of the thorium phosphate and the radiolytic effects have no significant influence on this matrix.

EXAMPLE 12

Preparation of Th$_4$P$_6$O$_{23}$ Labelled by $^{137}$Cs, $^{85}$Sr and $^{60}$Co In this example synthesis takes place of a mixed thorium phosphate having three different radioactive elements. The starting product is a mixture of aqueous solutions containing 0.730 cm$^3$ of ThCl$_4$(1.01 M) and 0.5 cm$^3$ of a solution with a total activity of $^{137}$Cs of 2.48 MBq, of $^{85}$Sr of 1.50 MBq and of $^{60}$Co of 4.19 MBq. To this mixture are added 0.230 cm$^3$ of 4.85 mole/l orthophosphoric acid. The residue of the evaporation to dryness is ground and then treated at 400° C. for 2 hours and 1050° C. for 15 hours.

This gives 0.2 g of thorium phosphate labelled with the isotopes: $^{137}$Cs, $^{85}$Sr and $^{60}$Co following all the synthesis stages.

EXAMPLE 13

In this example testing takes place of the leaching resistance of the product obtained in example 12.

To this end, contacting takes place between 200 mg of the product and 4 cm$^3$ if distilled water and the complete solution in contact with the powder is replenished several times so as to wash the surface and thus eliminate the small grains.

The powder sample is then stirred for 3 to 4 days in 4 cm$^3$ of water, followed by centrifuging at 3500 r.p.m. for 30 minutes and then 1300 r.p.m. for 30 minutes, in order to bring about the separation of the solid and liquid phases. Most of the solution in contact (3.5 cm$^3$) is then sampled before being replenished. Following the separation of the solid and liquid phases, determination occurs of the quantity of each radioactive element which has passed into solution by measuring the radioactivity due to each of them in the liquid phase by γ spectrometry. The activity percentages measured in solution, with respect to the initial activity introduced, are given in the following table 3.

TABLE 3

| Radioactive element | Initial activity introduced (MBq) | Specific activity (MBq/g of phosphate) | Percentage activity measured in solution |
|---|---|---|---|
| $^{137}$Cs | 2.48 | 12.40 | (1.4 ± 0.2) · 10$^{-2}$ |
| $^{85}$Cs | 1.50 | 7.50 | (7.1 ± 1.0) · 10$^{-3}$ |
| $^{60}$Co | 4.19 | 20.95 | (5.9 ± 0.8) · 10$^{-3}$ |

We claim:

1. Thorium phosphate of formula Th$_4$P$_6$O$_{23}$ (I) or Th$_4$(PO$_4$)$_4$(P$_2$O$_7$) (II).

2. Thorium phosphate according to claim 1, wherein said thorium phosphate has the X-ray diffraction pattern shown in FIG. 1.

3. Thorium phosphate according to wherein said thorium phosphate crystallizes in an orthorhombic system, space group Pbcm and Z=2.

4. Process for the preparation of thorium phosphate of formula $Th_4P_6O_{23}$, comprising the steps of:
   a) preparing an aqueous solution optionally containing another water-miscible solvent and containing a thorium salt and a phosphating agent in quantities such that the Th/P atomic ratio is ¼ to ⅔,
   b) evaporating the solution to dryness at a temperature below 200° C. and
   c) subjecting the dry product to a heat treatment at least partly performed at a temperature from 850 to 1300° C.

5. Process according to claim 4, wherein said thorium salt is thorium tetrachloride or nitrate of formula $Th(NO_3)_4, 4H_2O$.

6. Process according to claim 4, wherein said phosphating agent is phosphoric acid or ammonium dihydrogenorthophosphate.

7. Process for the preparation of thorium phosphate of formula $Th_4P_6O_{23}$ comprising the steps of reacting a thorium compound in the solid state and a phosphating agent selected from the group consisting of ammonium dihydrogenorthophosphate and boron phosphate $BPO_4$, at a temperature of 165 to 210° C., followed by at least one grinding and at least one heat treatment of the product obtained by the reaction of the thorium compound and the phosphating agent, at a temperature of 850 to 1300° C., the quantities of the thorium compound and the phosphating agent being such that the atomic Th/P ratio is ¼ to ⅔.

8. Mixed thorium phosphate of formula:

$$Th_{4-x}M_{4x/v}P_6O_{23} \qquad (III)$$

in which:
   M is a monovalent, divalent, trivalent or tetravalent cation,
   v represents the valency state of the cation and is equal to 1, 2, 3 or 4 and
   x is such that:
      $0 < x \leq 3$ when v=4,
      $0 < x \leq 0.26$ when v=3,
      $0 < x \leq 0.1$ when v=2, and
      $0 < x \leq 0.036$ when v=1.

9. Mixed thorium phosphate according to claim 8, wherein M is uranium and v is equal to 4.

10. Mixed thorium phosphate according to claim 8, wherein M is an alkaline earth metal or $UO^{2+}$ and v is equal to 2.

11. Mixed thorium phosphate according to claim 8, wherein M is a rare earth element or a trivalent actinide and v is equal to 3.

12. Mixed thorium phosphate according to claim 8, wherein the cation M comprises a radioactive element.

13. Process for the preparation of a mixed thorium phosphate of formula:

$$Th_{4-x}M_{4x/v}P_6O_{23} \qquad (III)$$

in which:
   M is a monovalent, divalent, trivalent or tetravalent cation,
   represents the valency state of the cation and is equal to 1, 2, 3 or 4 and
   x is such that:
      $0 < x \leq 3$ when v=4,
      $0 < x \leq 0.26$ when v=3,
      $0 < x \leq 0.1$ when v=2, and
      $0 < x \leq 0.036$ when v=1,
comprising the steps of:
   a) preparing an aqueous or aqueous alcoholic solution incorporating a thorium salt, a salt of cation M and a phosphating agent in quantities such that the atomic ratio (Th+M)/P is approximately $$\frac{4 - x + \frac{4x}{v}}{6}$$

and that the cation M is not in excess compared with the maximum value of x given in formula (III),
   b) evaporating the solution to dryness at a temperature below 200° C., and
   c) subjecting the dry product to a heat treatment at a temperature of 850 to 1300° C.

14. Process for the preparation of a mixed thorium phosphate of formula:

$$Th_{4-x}M_{4x/v}P_6O_{23} \qquad (III)$$

in which:
   M is a monovalent, divalent, trivalent or tetravalent cation,
   v represents the valency state of the cation and is equal to 1, 2, 3 or 4 and
   x is such that:
      $0 < x \leq 3$ when v=4,
      $0 < x \leq 0.26$ when v=3,
      $0 < x \leq 0.1$ when v=2, and
      $0 < x \leq 0.036$ when v=1,
comprising the steps of reacting a thorium compound in the solid state, a compound of M and a phosphating agent selected from the group consisting of ammonium dihydrogenorthophosphate and boron phosphate $BPO_4$, at a temperature of 165 to 210° C., followed by at least one grinding and at least one heat treatment of the product obtained by the reaction of the thorium compound, the compound of M and the phosphating agent at a temperature of 850 to 1300° C., the quantities of the thorium compound, the compound of cation M and the phosphating agent being such that the atomic ratio (Th+M)/P is approximately $$\frac{4 - x + \frac{4x}{v}}{6}$$

and that M is not in excess compared with the maximum value of x given in formula (III).

15. Process for the preparation of a mixed thorium phosphate of formula:

$$Th_{4-x}M_{4x/v}P_6O_{23} \qquad (III)$$

in which:
   M is a monovalent, divalent, trivalent or tetravalent cation,
   v represents the valency state of the cation and is equal to 1, 2, 3 or 4 and
   x is such that:
      $0 < x \leq 3$ when v=4,
      $0 < x \leq 0.26$ when v=3,
      $0 < x \leq 0.1$ when v=2, and $0 < x \leq 0.036$ when $v=1$, comprising the steps of reacting in the solid state, in the form of a powder and at a temperature of 850 to 1350° C., $Th_4P_6O_{23}$ and a phosphate of the cation M in a quantity such that the cation M does not represent an excess compared with the maximum value of x in formula (III), followed by a heat treatment on the product obtained at a temperature of 850 to 1300° C.

16. Process for the storage of radioactive products containing radioelements, comprising the steps of providing a mixed thorium phosphate of formula:

$$Th_{4-x}M_{4x/v}P_6O_{23} \qquad (III)$$

in which:

v represents the valency state of the cation and is equal to 1, 2, 3 or 4 and

M represents a monovalent, divalent, trivalent or tetravalent cation containing the radioelement, x is such that:
$0 < x \leq 3$ when $v=4$,
$0 < x \leq 0.26$ when $v=3$,
$0 < x \leq 0.1$ when $v=2$, and
$0 < x \leq 0.036$ when $v=1$, and adding said radioelements to said mixed thorium phosphate.

17. Process for the storage of radioactive products comprising the steps of providing a matrix of thorium phosphate or mixed thorium phosphates according to any one of claims 1, 2, 8, 9, 10 and 11, and dispersing said radioactive products in said matrix of thorium phosphate or mixed thorium phosphates.

18. Process according to claim 17, characterized in that the radioactive products are selected from the group consisting of radium, uranium, plutonium, neptunium, americum, curium and fission products.

19. Process for the storage of radioactive products comprising the steps of providing a matrix of thorium phosphate or mixed thorium phosphates according to claim 3, and dispersing said radioactive products in said matrix of thorium phosphate or mixed thorium phosphates.

20. Process for the storage of radioactive products comprising the steps of providing a matrix of thorium phosphate or mixed thorium phosphates according to claim 12, and dispersing said radioactive products in said matrix of thorium phosphate or mixed thorium phosphates.

* * * * *